(12) United States Patent
Ishaug et al.

(10) Patent No.: US 9,860,053 B2
(45) Date of Patent: Jan. 2, 2018

(54) SYNCHRONIZATION OF SBS SUPPRESSION MODULATION TO ENABLE SMALL OFFSET, OBI FREE, WDM SIGNAL TRANSMISSION

(71) Applicant: Aurora Networks, Inc., San Jose, CA (US)

(72) Inventors: Brian Ishaug, Pleasanton, CA (US); Sudhesh Mysore, Morgan Hill, CA (US)

(73) Assignee: Aurora Networks, Inc., San Jose, CA (US)

( * ) Notice: Subject to any disclaimer, the term of this patent is extended or adjusted under 35 U.S.C. 154(b) by 0 days.

(21) Appl. No.: 15/130,350

(22) Filed: Apr. 15, 2016

(65) Prior Publication Data

US 2016/0308664 A1    Oct. 20, 2016

Related U.S. Application Data

(60) Provisional application No. 62/148,957, filed on Apr. 17, 2015.

(51) Int. Cl.
| | | |
|---|---|---|
| H04B 10/00 | (2013.01) | |
| H04L 7/00 | (2006.01) | |
| H04B 10/2537 | (2013.01) | |
| H04B 10/50 | (2013.01) | |
| H04B 10/25 | (2013.01) | |
| H04B 10/516 | (2013.01) | |
| H04B 10/572 | (2013.01) | |
| H04B 10/58 | (2013.01) | |

(52) U.S. Cl.
CPC ....... *H04L 7/0075* (2013.01); *H04B 10/2504* (2013.01); *H04B 10/2537* (2013.01); *H04B 10/506* (2013.01); *H04B 10/5051* (2013.01); *H04B 10/5161* (2013.01); *H04B 10/572* (2013.01); *H04B 10/58* (2013.01); *H04L 7/0091* (2013.01)

(58) Field of Classification Search
CPC . H04L 7/0075; H04L 7/0091; H04B 10/5161; H04B 10/2504; H04B 10/58; H04B 10/572; H04B 10/506; H04B 10/5051; H04B 10/2537
See application file for complete search history.

(56) References Cited

U.S. PATENT DOCUMENTS

| | | | | |
|---|---|---|---|---|
| 5,798,858 A | * | 8/1998 | Bodeep | H04J 14/0298 398/158 |
| 6,078,414 A | * | 6/2000 | Iwano | H04B 10/506 398/1 |

(Continued)

OTHER PUBLICATIONS

PCT Search Report & Written Opinion, RE: Application No. PCT/US2016/027915, dated Jul. 22, 2016.

(Continued)

*Primary Examiner* — Danny Leung
(74) *Attorney, Agent, or Firm* — Thomas A. Ward (57) ABSTRACT

Synchronizing SBS suppressing optical phase/frequency modulation of each of a plurality of optical transmitters can be achieved with a plurality of optical transmitters conveying a plurality of optical carriers; and a synchronizer coupled to each of the plurality of optical transmitters to synchronize the SBS suppressing optical phase/frequency modulation of each of the plurality of optical carriers.

16 Claims, 5 Drawing Sheets

(56) References Cited

U.S. PATENT DOCUMENTS

| | | | | |
|---|---|---|---|---|
| 6,559,996 | B1* | 5/2003 | Miyamoto | H04B 10/505 398/154 |
| 7,756,421 | B2* | 7/2010 | Roberts | H04B 10/2543 398/158 |
| 7,848,661 | B2* | 12/2010 | Iannelli | H04B 10/505 398/186 |
| 7,936,997 | B2* | 5/2011 | Ramachandran | H04B 10/25751 398/192 |
| 2008/0273874 | A1* | 11/2008 | Ramachandran | H04B 10/25751 398/43 |
| 2008/0317468 | A1* | 12/2008 | Villarruel | H04J 14/0282 398/68 |
| 2012/0263472 | A1* | 10/2012 | Wu | H04J 14/02 398/79 |
| 2016/0308664 | A1* | 10/2016 | Ishaug | H04B 10/5161 |

OTHER PUBLICATIONS

K. Torii, et al., "Efficiencey Improvement of Optical Fiber Wavelength Converter Without Spectral Spread Using Synchronous Phase/Frequency Modulations", Journal of Lightwave Technology, IEEE Service Center, vol. 21, No. 4, Apr. 1, 2003, pp. 1039-1045.

* cited by examiner

SYNCHRONIZATION OF SBS SUPPRESSION MODULATION TO ENABLE SMALL OFFSET, OBI FREE, WDM SIGNAL TRANSMISSION

CROSS-REFERENCE TO RELATED APPLICATION

Referring to the application data sheet filed herewith, this application claims a benefit of priority under 35 U.S.C. 119(e) from provisional patent application U.S. Ser. No. 62/148,957, filed Apr. 17, 2015, the entire contents of which are hereby expressly incorporated herein by reference for all purposes.

BACKGROUND

HFC transmitters are commonly used in the CATV industry to send a broadband carrier multiplexed RF signal containing content such as television channels, video on demand and cable modem data from a head end or substation to a remote location. The HFC transmitter converts the broadband RF electrical signal, typically carried on a coaxial cable, into a primarily amplitude modulated optical signal that is sent over fiber optics to the destination where the signals is converted back to a broadband electrical signal using a high speed photodetector. The resulting electrical signal is then typically amplified and distributed over coaxial cables to the end users. This method of RF signal distribution has several advantages over a pure coaxial cable distribution method. Fiber optic cables have much lower loss than coaxial electrical cables, so signals can be transmitted much further before requiring amplification. Also, fiber optics are immune to RF interference, so the signal do not degrade due to RF ingress from external sources during transmission. Finally, multiple optical channels can be combined onto a single fiber, allowing multiple broadband RF signals to be sent over the same fiber. This is commonly done to segment the distribution network into smaller subscriber groups without the need to install additional cables. For these reasons and others not mentioned, a HFC distribution system is usually the most cost effective way to distribute CATV signals.

One of the more cost effective ways to make an HFC transmitter is using a directly modulated Distributed Feedback (DFB) semiconductor laser. However, DFB lasers suffer from chirp, which is unwanted optical frequency modulation that occurs in correlation with the optical amplitude modulation. Although this chirp helps increase the SBS threshold of the transmitter, enabling high optical launch powers and long transmission distances, it also causes a large amount of in-band Inteferometric Intensity Noise (IIN) and leads to chirp-dispersion distortion of the RF signal. Chirp-dispersion distortion is particularly problematic in the C-band (~1550 nm) because most installed fiber has a large dispersion coefficient in this band. The C-band is usually the preferred band to transmit at because the optical loss of most installed fiber is the smallest in the C-band, the C-band optical channels can be readily amplified with an Erbium Doped Fiber Amplifier (EDFA) and it's possible to multiplex multiple optical channels onto a single fiber in the C-band with minimal impairments.

One method to overcome the signal degradation caused by IIN and chirp-dispersion distortion in the C-band is to reduce or eliminate the chirp or optical frequency/phase modulation that occurs in conjunction with the amplitude modulation. Low or no chirp amplitude modulation can be accomplished by externally modulating an optical carrier using a Mach-Zehnder (MZ) modulator or an Electro-Absorption (EA) modulator. Also, a directly modulated DFB laser paired with an optical phase modulator that compensates for the chirp can produce a low chirp output, see U.S. Pat. No. 7,848,661 and U.S. Pat. No. 7,936,997 the entire contents of both of which are hereby incorporated herein for all purposes. Regardless of the method used to produce a low chirp optical amplitude modulation, reducing or eliminating the chirp causes a reduction in the SBS threshold due to the reduction in optical linewidth. SBS is non-linear effect that limits launch power. When too much optical power is contained in too narrow of a band, the fiber starts to act like a Distributed Bragg Reflector and the power is reflected back to the source. This effect can severely limit the optical launch power into the fiber, which reduces the effective transmission distance.

To overcome the problem of low SBS thresholds in low chirp HFC transmitters, a high frequency optical phase/frequency modulation can be added. This phase/frequency modulation increases the effective optical linewidth of the laser, splitting the optical carrier into multiple lines with lower optical power, which increases the SBS threshold. There are several ways to modulate the optical phase/frequency of the transmitter including, but not limited to, using an optical phase modulator or directly modulating the drive laser of an externally modulated transmitter.

An optical phase modulator is a waveguide device made out a material whose index of refraction changes with applied electrical field. By applying a high frequency electrical modulation, a high frequency optical phase modulation can be produced. Directly modulating the drive lasers of an externally modulated transmitter can produce a large optical frequency modulation due to the large chirp parameter of these lasers. Regardless of the method of obtaining the optical phase/frequency modulation, the frequency can be greater than 2 times the highest transmission signal frequency in order to avoid signal degradation due to intermodulation effects. For example, if it is desired to transmit a 1 GHz broadband RF signal, the optical phase modulation can be at a frequency of at least 2 GHz.

In a point to point link with only 1 optical transmission channel, the combination of low chirp amplitude modulation and a high frequency SBS suppressing optical phase/frequency modulation produces an effective HFC transmitter with high optical launch power capabilities, low noise and low distortion. However, the high frequency optical phase/frequency modulation can create problems in WDM systems if it is not synchronized between transmitters. When the optical phase/frequency modulation is not synchronized, the OBI bandwidth from the transmitters beating with FWM products becomes very large. This OBI can severely degrade signal quality. Although it is possible to shift the OBI out of band by offsetting the optical transmission wavelengths from a uniform grid, the large wavelength offset requirements to shift OBI completely out of band in a WDM system with unsynchronized optical phase/frequency modulation would severely limit the number of optical channels that can be added to an OBI free WDM system. However, if the SBS suppressing optical phase/frequency modulation amplitude, frequency and phases are synchronized between transmitters, higher order harmonics of OBI cancel and the OBI RF spectrum becomes very narrow. This allows much smaller wavelength offsets and a larger number of optical channels to be added to an OBI free WDM system.

One method to synchronize the SBS suppressing optical phase modulation is to add it after the WDM mux using an optical phase modulator as in U.S. Pat. No. 7,936,997. In this case, because the same optical phase modulator modulates all the optical transmission channels simultaneously, there is inherent synchronization. However, this requires an additional optical phase modulator to be added after the optical mux, which can be costly and adds additional optical loss. If the optical sources themselves have optical phase/frequency modulation capabilities that can be used for SBS suppression, it would be desirable to use those mechanisms instead to minimize additional cost and optical loss. There may also be other reasons to add the SBS suppressing optical phase/frequency modulation to each source separately. Regardless of the reason to add the phase/frequency modulation separately to each source, there is no inherent synchronization mechanism. What is desired is means to synchronize the SBS suppressing optical phase/frequency modulation between transmitters when added before the mux in order to allow small wavelength offsets without signal degradation due to in-band OBI from FWM products beating with the transmitted signals.

SUMMARY

There is a need for the following embodiments of the present disclosure. Of course, the present disclosure is not limited to these embodiments.

According to an embodiment of the present disclosure, a method comprises: synchronizing SBS suppressing optical phase/frequency modulation of each of a plurality of optical transmitters. According to another embodiment of the present disclosure, an apparatus comprises: a plurality of optical transmitters conveying a plurality of optical carriers; and a synchronizer coupled to each of the plurality of optical transmitters to synchronize the SBS suppressing optical phase/frequency modulation of each of the plurality of optical carriers.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings. The described embodiments may be better understood by reference to one or more of these drawings in combination with the following description presented herein. It should be noted that the features illustrated in the drawings are not necessarily drawn to scale.

DETAILED DESCRIPTION

Embodiments presented in the present disclosure and the various features and advantageous details thereof are explained more fully with reference to the nonlimiting embodiments that are illustrated in the accompanying drawings and detailed in the following description. Descriptions of well known materials, techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

Hybrid Fiber-Coax (HFC) transmitters that employ low chirp modulation techniques require means to increase the Stimulated Brillouin Scattering (SBS) threshold to allow higher launch powers and longer reach. One method to increase the SBS threshold is to add a high frequency optical phase/frequency modulation at a frequency at least twice the highest signal transmission frequency. When an unsynchronized optical phase/frequency modulation is added to each carrier in a Wavelength Division Multiplexing (WDM) system, a very broadband RF Optical Beat Interference (OBI) is produced when optical Four Wave Mixing (FWM) products beat with the optical transmission signals at the photodetector. This broadband OBI will degrade signal quality unless large wavelength offsets are used to shift the OBI RF spectrum completely out of the signal transmission band. However, large wavelength offsets will limit the number of optical channels that can be added to an OBI free WDM system. When means are provided to synchronize the SBS suppressing optical phase/frequency modulation of each optical carrier, most or all higher order harmonics of OBI cancel out and the OBI RF spectral width becomes smaller, allowing smaller wavelength offsets to be used and thus a larger number of optical channels to be added to an OBI free WDM system.

To synchronize the phase and frequency of the optical phase/frequency modulation when applied separately to each optical source, means for synchronization of the electrical modulation signal driving the optical phase/frequency modulation mechanism are provided. The means for synchronization can include, but are not limited to, an electrical synchronization clock sent to each source that provides the reference for a Phase Lock Loop (PLL) circuit connected to a Voltage Controlled Oscillator (VCO) that supplies the optical phase/frequency modulation driving signal. In this case, the PLL circuit locks the electrical frequency and phase of the VCO to the reference clock. By insuring the clock edge arrives at the PLL circuit in all transmitters at the same time, the phase of the optical phase/frequency modulation driving signal will be synchronized between all transmitters. The synchronization means could also include using a single SBS suppression tone oscillator whose signal is split, sent to all transmitters and used to modulate the optical phase of each transmitter. Again, provided the signal is delayed by equal amounts after being split and sent to each transmitter, the phase and frequency of the optical phase modulation would be synchronized between transmitters.

In order to get the best cancelation of harmonics of OBI, the amplitude of the optical phase/frequency modulation also can be substantially the same from transmitter to transmitters. To deal with potential variation in the phase/frequency modulation amplitude from transmitter to transmitter, means to individually adjust the amplitude of the electrical signal driving the phase/frequency modulation mechanism can be provided in each transmitter. Such means of electrical modulation amplitude control could include, but are not limited to, a Digital Step Attenuator (DSA) or PIN attenuator to adjust the electrical amplitude of oscillator driving the optical phase modulation mechanism. Of course, if the phase modulation amplitude is consistent from transmitter to transmitter without the need for adjustments, the optical phase/frequency modulation amplitude could be set by design.

It should be pointed out that even if the SBS suppression optical phase/frequency modulation contains some corresponding amplitude modulation, such as would be the case if the optical phase modulation is provided by directly modulating a high chirp drive laser of an externally modulated transmitter, synchronization of the SBS suppressing optical modulation will still substantially reduce or eliminate many harmonics of OBI, reducing the OBI RF spectral width and enabling smaller wavelength offsets. However, the best cancellation of OBI harmonics and reduction of OBI RF spectral width will be obtained when there is no corresponding amplitude modulation.

To minimize the amplitude modulation component when directly modulating the drive laser of an externally modulated transmitter to produce a SBS suppressing optical frequency modulation, a portion of the SBS suppression modulation drive signal can be inverted and applied to the external modulator. When the amplitude of the external modulation is the same as that produced by directly modulating the laser, but 180 degrees out of phase, this will substantially cancel the amplitude modulation component. It should be noted that the electrical driving signal to the laser and modulator would need to be appropriately delayed to achieve 180 degree out of phase modulation conditions. Also, signal inversion would only be required if the external modulation mechanism producing increasing power with increasing voltage as would be the case for directly modulating the drive laser.

It should also be noted that the SBS suppressing optical phase/frequency modulation may contain more than one sinusoidal modulation frequency or tone. There is effectively no limit on the number of tones than can be applied. As long as the requirement that the SBS suppression modulation does not contain frequency components less than 2 times the highest frequency in the transmitted RF signal, there will be no signal degradation due to intermodulation effects. Furthermore, provided the optical phase modulation amplitude and frequencies of each tone are substantially equal and the phase of each tone are substantially synchronized, the higher order harmonics of OBI will substantially cancel allowing smaller wavelength offsets between FWM products and the transmitted optical signal without signal degradation due to OBI from FWM products beating with the transmitted optical signal.

Finally, to clarify what an optical phase/frequency modulation mechanism is, it is pointed out that phase modulation and frequency modulation are related by the following equations:

$$\omega = \frac{d\theta}{dt}$$

$$\theta = \int \omega dt$$

where $\omega$ is frequency and $\theta$ is phase. Based on these equations, it can be shown that a sinusoidal phase modulation given by $$\theta(t) = A \sin(\omega_m t)$$

is the same thing as a sinusoidal frequency modulation, phase shifted $\pi/2$ radians or 90 degrees.

$$\omega(t) = \frac{d}{dt}(A\sin(\omega_m t)) = \omega_m A\cos(\omega_m t) = \omega_m A\sin(\omega_m t + \pi/2)$$

Similarly, a sinusoidal frequency modulation given by $$\omega(t) = B \sin(\omega_m t)$$

is the same thing as a sinusoidal phase modulation $$\theta(t) = \int B\sin(\omega_m t)dt = -\frac{A}{\omega_m}\cos(\omega_m t) = -\frac{A}{\omega_m}\sin(\omega_m t + \pi/2)$$

Therefore, an optical phase modulation mechanism can also be considered an optical frequency modulation mechanism and vise versa. In the description of embodiments of this disclosure, the distinction between a phase modulation mechanism and a frequency modulation mechanism is generally not important unless some optical sources suppress SBS using a phase modulation mechanism and others suppress SBS using a frequency modulation mechanism. In this case, the synchronization signals sent to the frequency modulation mechanisms would need to be phase shifted 90 degrees relative to the synchronization signals sent to the phase modulation mechanism. However, assuming all sources use the same mechanism to modulate the optical phase, the term optical phase/frequency modulation mechanism is meant to include any mechanism that produces a modulation of the optical phase.

It should also be noted that although this disclosure is intended to be applied primarily to broadband RF signal transmission such as CATV signals, it can also be applied to the transmission of any type of signal in which the transmitted signal has an effective upper frequency limit and the SBS suppressing optical phase/frequency modulation is applied at a frequency of at least or at frequencies no less than two times the highest frequency component of the signal to be transmitted. Furthermore, it could also be applied to the transmission of signals that have frequency components that exceed ½ the lowest frequency component in the SBS suppressing modulation provided the transmitted signals can tolerate the intermodulation distortion that may occur.

Figure 1:
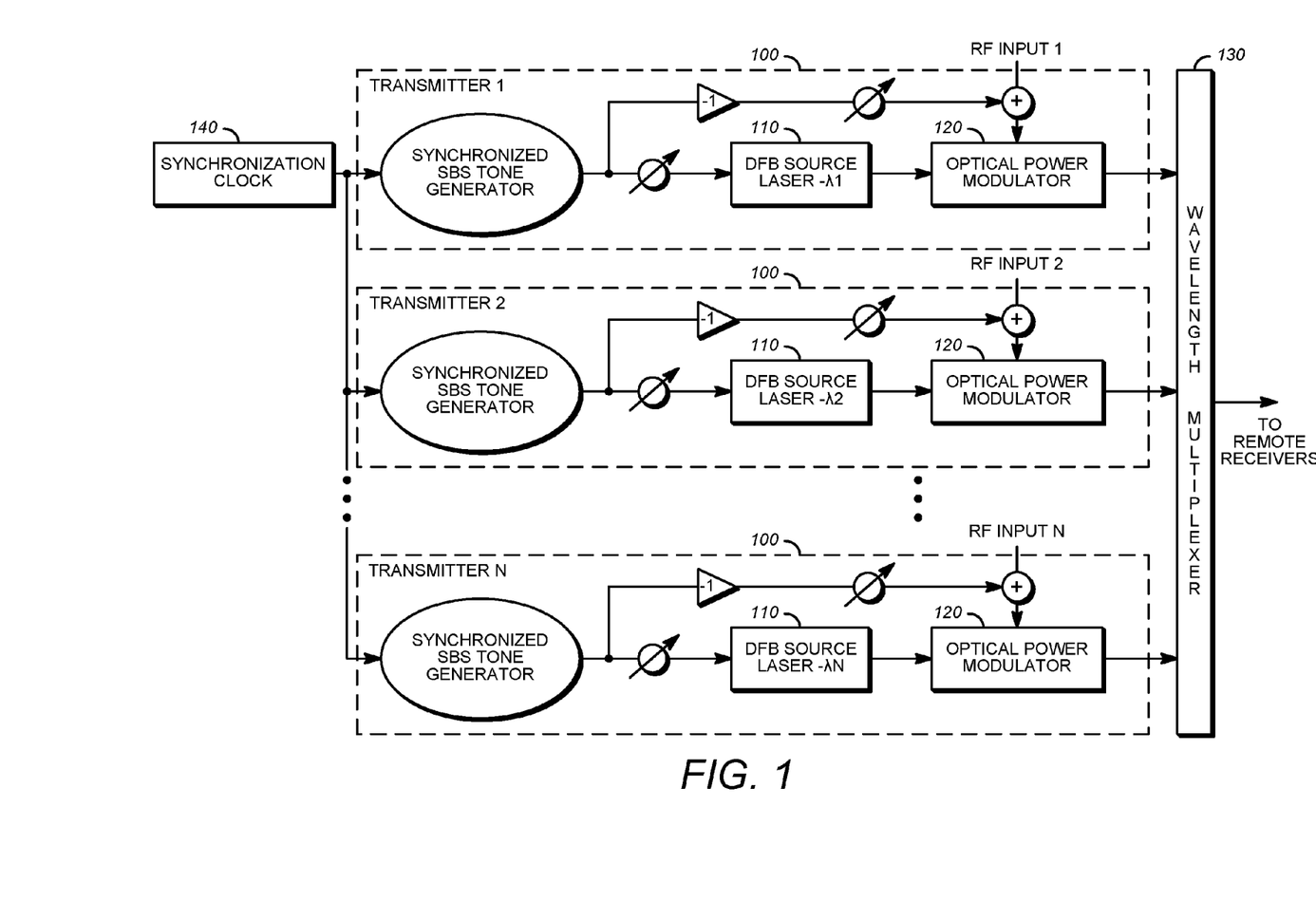
FIG. 1. shows an embodiment of the disclosure applied to a plurality of externally modulated optical transmitters; synchronization is accomplished with a synchronization clock that is coupled to each of the plurality of externally modulated optical transmitters.

A preferred embodiment of the disclosure is shown in FIG. 1. In this case, the embodiment is applied to a WDM HFC transmission system using externally modulated lasers. The system includes 2 or more optical transmitters 100, each transmitting at a different optical wavelength. Each optical wavelength has a broadband RF electrical signal to be transmitted encoded as optical power modulation. An optical carrier is produced by the DFB drive laser 110 and the power is modulated external to the laser cavity with a power modulation mechanism via optical power modulator 120 that produces little or no corresponding optical phase or frequency modulation, also known as chirp. The optical outputs from each transmitter are combined by an optical MUX (wavelength multiplexer 130) and sent over a single optical fiber to a remote location. At the remote location (not shown), a de-mux is used to separate the optical signals by wavelength with each wavelength going to a separate photodetector. The photodetector converts the optical power modulation on each wavelength back into a broadband RF electrical signal for amplification and distribution to the end users.

An SBS suppressing primarily optical frequency modulation is added to the optical carrier of each transmitter shown in FIG. 1. by directly electrically modulating the bias of the DFB drive laser with a high frequency tone which is at a frequency at least 2 times the highest frequency component of the signal to be transmitted. Direct modulation of the laser produces optical frequency modulation as a result of the dependence of the index of refraction in the optical cavity to injected electrical current. Direct modulation may also produce some corresponding optical power modulation. This can be eliminated by applying an equal but opposite modulation with the external modulation mechanism as will be described in more detail later.

Means to synchronize the phase and frequency of the electrical SBS suppression tones driving the lasers are shown in FIG. 1. In this case, synchronization is achieved using a common clock distributed to all transmitters. A synchronization clock 140 is coupled to each of a plurality of transmitters. The SBS tone generators lock the frequency of each SBS tone to the same multiple of the clock frequency as well as to the phase of the clock. Fixed or adjustable delays (not shown) may be added to insure the optical frequency modulations at the output of the optical mux are phase synchronization between transmitters. Phase synchronization means that all transmitters are being modulated in unison. Adjustable delays may be needed to compensate for variation in path lengths between the outputs of the transmitters, clock signal path lengths and other delay mechanisms that can cause the relative phase of the optical frequency modulation at the output of the optical mux to not be in unison. An example of an adjustable electronic delay mechanism can include a clock generator with separate outputs for each transmitter in which the clock generator has the ability to adjust the relative phase of each output. Another example of an adjustable electronic delay mechanism can include a mechanism in the SBS tone generator to adjust the phase of the SBS tone relative to the clock signal input. An example of a fixed physical delay mechanism can include clock distribution cables that are specific lengths to provide appropriate clock signal delays to insure the optical frequency modulations are aligned at the output of the optical mux.

In addition to synchronization of the SBS tone phase and frequency, for optimum cancellation of the harmonics of OBI, the amplitude of the optical frequency modulation can also be substantially the same from transmitter to transmitter. This can be set by design or may require optical frequency modulation amplitude adjustment capability associated with each transmitter. Adjusting the electrical amplitude of the SBS tone modulating the DFB drive laser, as shown in FIG. 1., is perhaps the easiest way to adjust the optical frequency modulation amplitude. Electrical amplitude control means for the SBS tone can include, but are not limited to, a digital step attenuator or PIN attenuator.

As mentioned above, creating an SBS suppressing optical phase modulation by directly modulating the high chirp DFB drive lasers of an externally modulated transmitter may also produce some corresponding optical power modulation. This corresponding optical power modulation may create some higher order harmonics in the OBI RF spectrum that may interfere with transmitted signal. If it is desired to suppress the corresponding optical power modulation when directly modulating the DFB laser to suppress harmonics of OBI or for any other reason, the external optical power modulator can be used to substantially cancel out the optical power modulation component of the SBS suppressing optical modulation as shown in FIG. 1. Assuming the optical power modulator produces and increase in optical power with increasing applied voltage, cancelation can be accomplished by driving the optical power modulator with an inverted version of the SBS tone used to drive the laser. With an appropriate amplitude control mechanism in the inverted SBS signal tone path and signal delays, the external modulator can be set to provide and equal magnitude, but opposite phase modulation which will substantially cancel the optical modulation from DFB laser.

The synchronized SBS tone generators shown in FIG. 1 can be implemented using a voltage controlled oscillator (VCO) and phase lock loop (PLL) circuitry that compares the VCO phase and frequency to the synchronization clock phase and frequency. The PLL circuit makes adjustments the VCO control voltage to keep the VCO frequency at a set multiple of the clock frequency and the phase at a set phase relative to the synchronization clock. The output of the VCO can be used as the synchronized SBS tone. The PLL circuits can incorporate phase adjustment capabilities that, as mentioned previously, can be used to adjust for variation in synchronization clock delay or other variations that may affect relative phases of the SBS suppressing optical modulations from transmitter to transmitter so as to achieve optical frequency modulation synchronization. Of course, phase adjustment may not be needed if the phase alignment can be guaranteed by design.

The optical power modulator shown in FIG. 1 can include a Mach-Zehnder modulator, an Electro-Absorption modulator or any optical power modulator that can produce low or no chirp optical power modulation of an optical carrier. The optical power modulator is external to the DFB laser cavity, but may be integrated onto the same die or into the same package. It may also be external to the laser package. The optical power modulator may also incorporate linearization circuits (not shown) to provide the appropriate drive signals to the optical modulator so a substantially linear optical power modulation is obtained in correlation with the RF input signal. Also, for simplicity, the bias and driving circuits for the optical modulator are not shown but assumed to be present as well. Finally, although FIG. 1 shows the optical transmitters as containing the SBS tone generator, laser and modulator, this is used for illustration purposes only. The system may be implemented with the various functions placed internal or external to the individual transmitter packages or even with all function combined into a single box.

Figure 2:
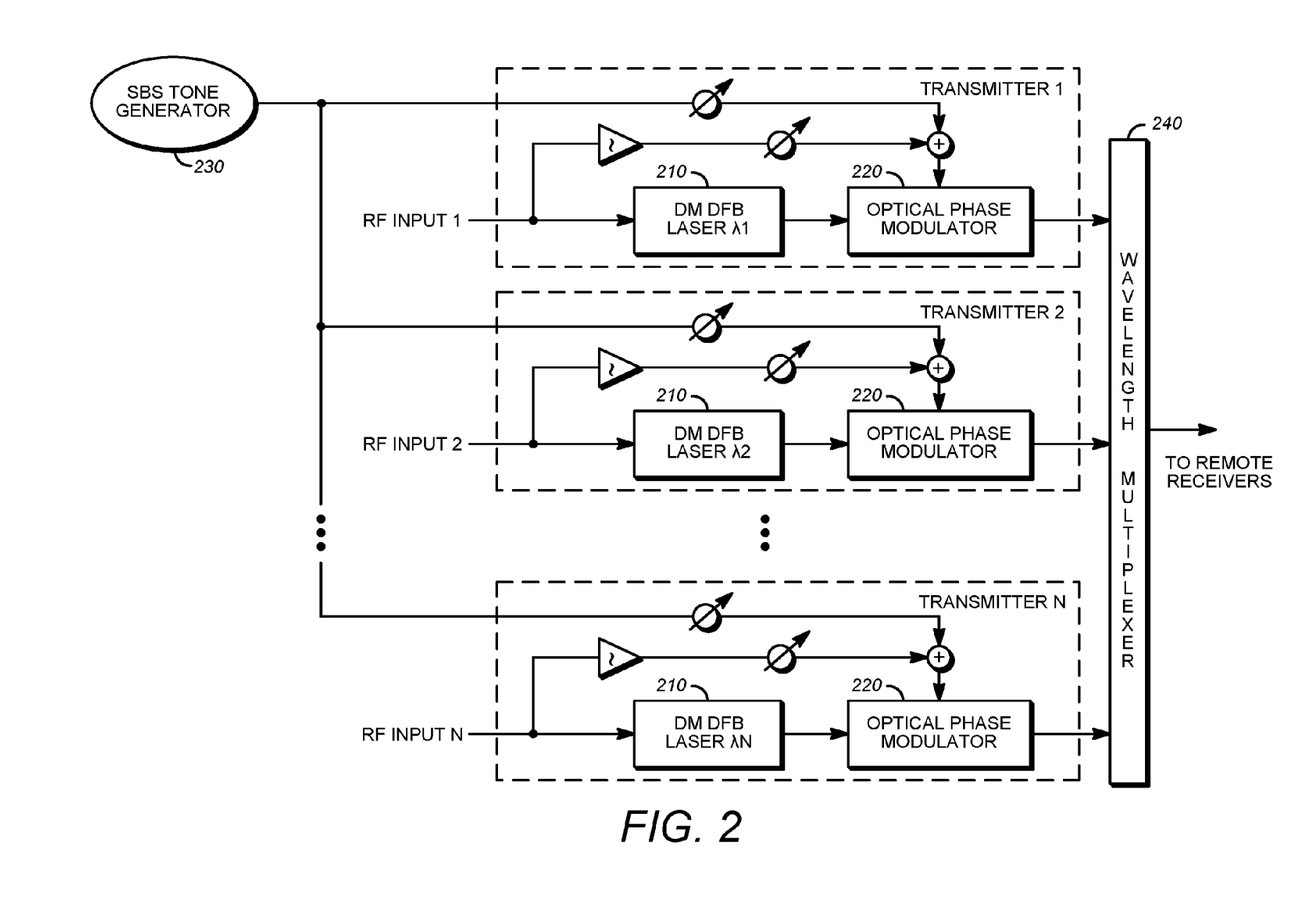
FIG. 2. shows an embodiment of the disclosure applied to a plurality of externally chirp compensated directly modulated DFB transmitters; synchronization is accomplished with an SBS tone generator that is coupled to each of the plurality of externally modulated optical transmitters.

FIG. 2 shows another embodiment of the disclosure. In this case, the embodiment is applied to directly modulated DFB lasers 210 with external optical phase modulators 220 used for chirp cancellation and SBS suppression. The DFB laser is directly modulated with the RF signal to be transmitted producing primarily optical amplitude modulation and some corresponding optical frequency modulation due to laser chirp. The optical phase modulator substantially cancels the optical frequency modulation as described in U.S. Pat. No. 7,936,997. The optical phase modulator can also be used to provide a high frequency SBS suppressing optical phase modulation. In this case, synchronization between transmitters is achieved by using the same SBS suppression modulation tone (SBS tone generator 230) to modulate all the optical phase modulators in the system. Appropriate amplitude control and fixed or adjustable phase delay mechanisms (no shown) can be applied to the SBS tone signal paths to insure the optical phase modulation amplitudes and phases are synchronized between all transmitters at the output of an optical mux 240. Gain may also be added if needed in appropriate locations (not shown) to get the required optical phase modulation amplitude needed to suppress SBS. The optical outputs from each transmitter are combined by the optical mux and sent over a single fiber to a remote location (not shown) where they are separated by wavelength and sent to separate photodetector for conversion back to RF electrical modulation for distribution to the customer.

The chirp cancellation mechanism of an optical phase modulator paired with a directly modulated laser, as shown in FIG. 2, has been previously described in U.S. Pat. No. 7,936,997. A portion of the broadband RF signal that drives the laser is split and sent to an electrical integrator. The integrator provides the necessary phase and magnitude vs frequency response required by the external optical phase modulator to compensate the chirp output by the DFB laser. Although not shown, an inverter may also be required as well as delay components so the signals to the laser and phase modulator are appropriately synchronized to compensate chirp. A broadband amplitude control element may also be needed after the integrator and/or in other appropriate locations to adjust the compensating phase modulation amplitude to substantially eliminate chirp.

It should be noted that sharing the same SBS tone generator between all transmitters to insure synchronization of the SBS suppressing optical phase modulation can also be applied to the externally modulated transmitters shown in FIG. 1. Similarly, synchronization of independent SBS tone generators using a common clock can also be applied to the chirp compensated, directly modulated DFB laser transmitters shown in FIG. 2. Also, both methods for synchronization can be applied to any HFC or RF over fiber transmitters that have or incorporate independent optical phase modulation mechanisms and would benefit from synchronization.

Figure 3A:
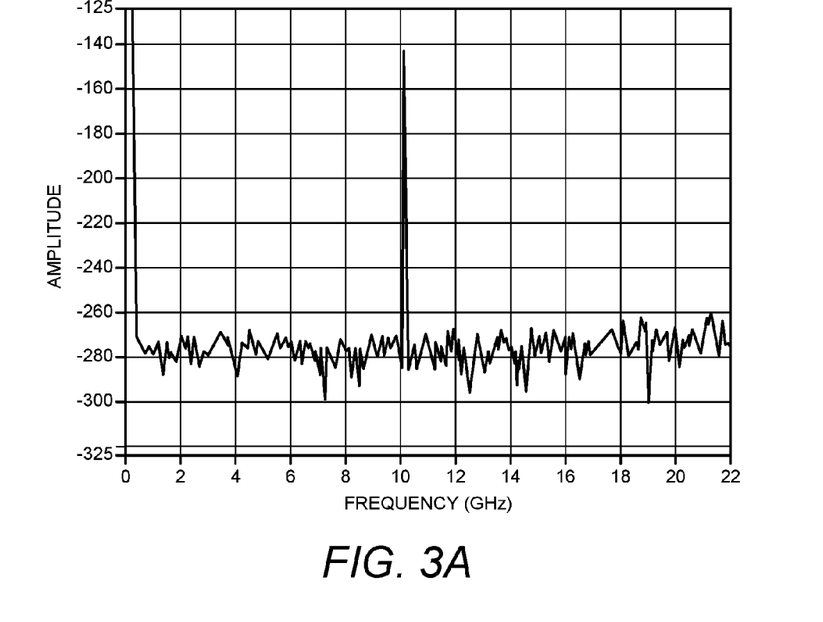
FIGS. 3A-3B shows simulated OBI RF spectrums from a FWM product beating with a transmitted optical signal in a WDM transmission system for FIG. 3A) phase unsynchronized 2.5 GHz SBS suppressing optical phase modulation, FIG. 3B) phase synchronized 2.5 GHz SBS suppressing optical phase modulations, FIG. 3C) phase synchronized 2.5 GHz SBS suppressing optical phase modulations with some corresponding amplitude modulation.
Figure 3B:
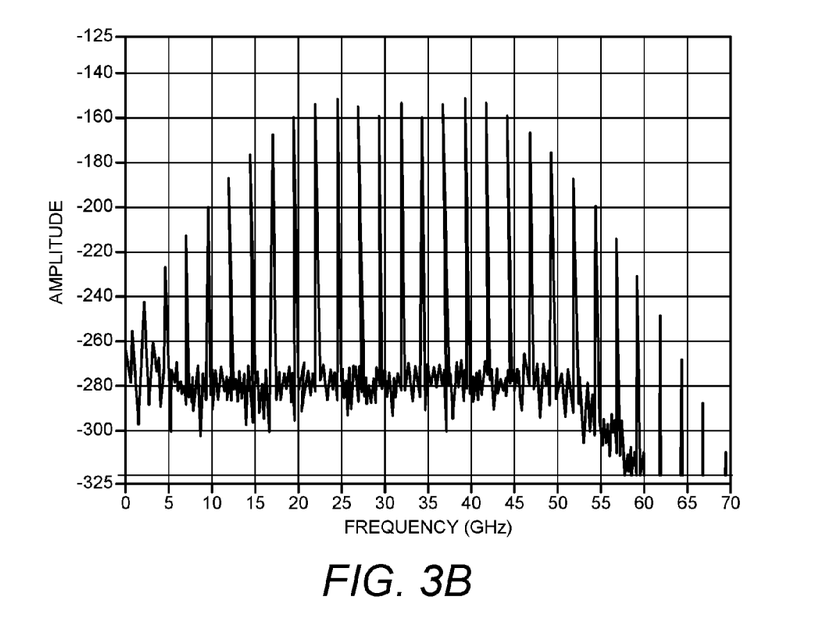
Figure 3C:
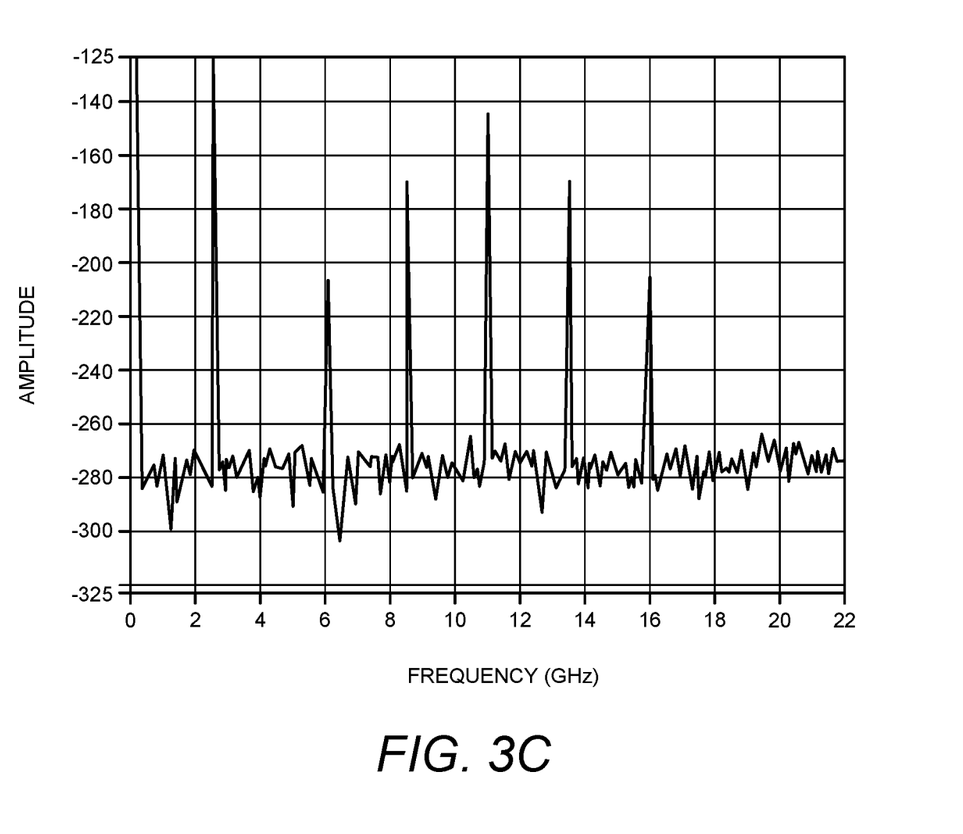

FIGS. 3A-3C show simulations of the OBI RF amplitude spectrum output by a photodetector when a transmitter optical signal and a FWM product overlap within the same optical channel creating beats that can interfere with the transmitted RF signal. In all cases, the optical phase modulation frequency was 2.5 GHz, which would support a broadband RF signal transmission bandwidth up to 1.25 GHz without signal degradation from intermodulation effects. Also, the amplitude of the optical phase modulation was the same for all transmitters and set to a value representative of the amplitude required to achieve optimum SBS suppression.

FIG. 3A illustrates simulation of OBI RF spectrum from FWM products beating with the transmitter when a phase synchronized 2.5 GHz SBS suppressing optical phase modulation is applied to all transmitters; offset=10 GHz. FIG. 3B illustrates Simulation of OBI RF spectrum when a 2.5 GHz SBS suppressing optical phase modulation is applied to all transmitters but not phase synchronized; offset=32 GHz. FIG. 3C illustrates simulation of OBI RF spectrum from FWM products beating with the transmitter when a phase synchronized 2.5 GHz SBS suppressing optical phase modulation with 5% OMI corresponding amplitude modulation is applied to all transmitters; offset=11 GHz.

In FIG. 3A, the OBI RF spectrum is shown for a situation when all transmitters have SBS suppressing optical phase/frequency modulations at the same 2.5 GHz frequency but different initial phase conditions. This would represent a situation where the SBS tone frequencies may be the same from transmitter to transmitter, but the tones are not properly phase synchronized either due to lack of synchronization means or improper phase delaying of the synchronization means so the optical phase/frequency modulations are not in unison at the output of the optical mux. In this case, the transmitter optical spectrum center frequency was offset from the FWM product center frequency by 32 GHz to shift the OBI RF spectrum to high frequencies centered at 32 GHz. A large number harmonics at multiples of +−2.5 GHz from the 32 GHz offset center can be seen in the OBI RF spectrum. It can be seen that even with a 32 GHz offset, harmonics can be seen at 2 GHz, very close to the upper end of the RF transmission signal band. It is easy to understand that even a small shift in the offset will cause the OBI RF spectrum to shift into the transmission signal band and degrade signal quality.

FIG. 3B shows the OBI RF spectrum when all transmitters have SBS suppressing optical phase/frequency modulations with synchronized initial phase conditions. This would represent a situation where the SBS tones have the same frequency and are properly phase synchronized to produce optical phase/frequency modulation from all transmitters in perfect unison at the output of the optical mux. In this case, the transmitter optical spectrum center frequency is offset from the FWM product center frequency by 10 GHz to shift the OBI RF spectrum to a frequency centered at 10 GHz. When only optical phase/frequency modulation is present and synchronized so all are modulating in perfect unison, no harmonics can be seen in the OBI RF spectrum. There is only a single narrow peak centered at 10 GHz, similar to what would be seen if no SBS suppressing phase/frequency modulation was applied to the transmitters. It is easy to understand that the wavelength offset between the FWM product and the transmitter can be as small as 1.25 GHz without the OBI RF spectrum degrading the signal quality of the RF signal to be transmitted in this case.

FIG. 3C shows the OBI RF spectrum when all transmitters have SBS suppression optical phase/frequency modulation with synchronized initial phase modulation and there is also some corresponding optical amplitude modulation. This would represent a situation where the SBS suppressing optical modulation is not a pure optical phase modulation but also contains some amplitude modulation such as would be the case if the SBS suppressing optical phase/frequency modulation is provided by directly modulating the drive laser of an externally modulated laser and the optical amplitude component of this modulation is not cancel out by the external modulator. In this simulation, the transmitter optical spectrum center frequency is offset from the FWM product center frequency by 11 GHz to shift the OBI RF spectrum to a frequency centered at 11 GHz. It can be seen that there are some harmonics visible in the OBI spectrum at +−2.5 GHz from the 11 GHz center. There is also an amplitude modulation signal present at 2.5 GHz, as would be expected. This peak is not due to OBI but simply the detection of the amplitude modulation component of the SBS suppressing optical modulation. In any case, it is easy to see that the OBI RF spectrum has significantly fewer harmonics than an unsynchronized OBI RF spectrum. The offset can be as small as 6.25 GHz without the OBI RF spectrum interfering with the RF signal to be transmitted. So synchronization can provide significant benefit even if there is some amplitude modulation components of the SBS suppressing optical modulation. It is also easy to understand from this that cancellation of the amplitude modulation component of the SBS suppressing optical modulation can provide some benefit as well.

Figure 4:
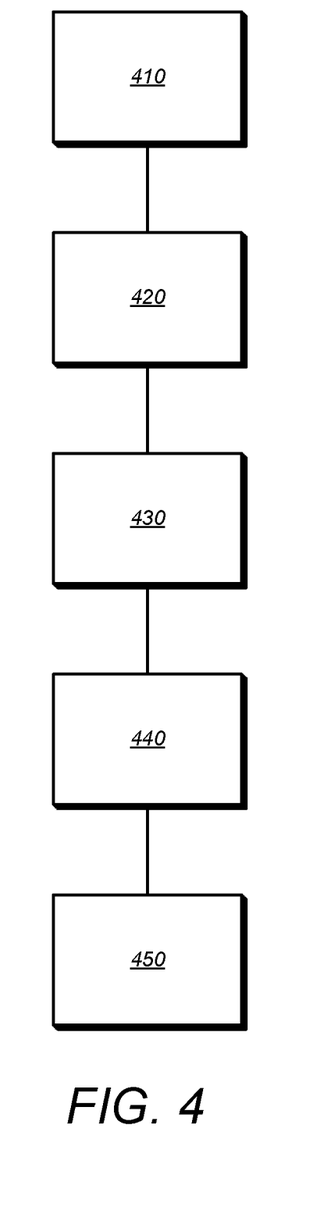
FIG. 4 is a flow diagram of a process that can be implemented by a computer program.

FIG. 4 shows a flow diagram of a process for transmitting RF signals over fiber optics that can be implemented by a computer program. The process can begin with a step 410 of generating two or more optical carriers, each at a different wavelength. The process can continue with a step 420 of modulating primarily the optical power of each optical carrier with a RF signal to be transmitted. The process can continue with a step 430 of modulating primarily the optical phase/frequency of each optical carrier. The process can continue with a step 440 of combining the modulated optical carriers for transmission over a single optical fiber. The process can continue with a step 450 of synchronizing the optical phase/frequency modulation of each optical carrier so that at the output of the optical combiner, the optical phase/frequency modulation of all carriers is substantially in unison and with substantially the same phase/frequency modulation amplitude. Step 450 can be more generically described as synchronizing SBS suppressing optical phase/frequency modulation of each of a plurality of optical transmitters Definitions The term common is intended to mean a coupling to each of a plurality of elements. The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term downstream is intended to mean the direction from a headend to customer premises equipment (CPE) (e.g. referring to FIGS. 1-2 from left to right). The term upstream is intended to mean the direction from customer premises equipment to a headend (e.g. referring to FIGS. 1-2 from right to left).

The term uniformly is intended to mean unvarying or deviate very little from a given and/or expected value (e.g., within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method, comprising synchronizing Stimulated Brillouin Scattering (SBS) suppressing optical phase/frequency modulation of each of a plurality of optical transmitters, wherein synchronizing includes controlling the timing of SBS suppressing optical phase/frequency modulation of each of the plurality of optical transmitters with a common synchronization clock.

2. The method of claim 1, wherein synchronizing includes sharing a common tone generator between each of the plurality of optical transmitters to provide a synchronized SBS suppressing optical phase/frequency modulation from each of the plurality of optical transmitters.

3. The method of claim 1, wherein the SBS suppressing optical phase/frequency modulation is at least one member selected from the group of a pure sinusoidal tone, multiple sinusoidal tones or a complex modulation function that provides a spread spectrum signal.

4. An apparatus, comprising:
a plurality of optical transmitters conveying a plurality of optical carriers; and
a synchronization mechanism coupled to each of the plurality of optical transmitters to synchronize Stimulated Brillouin Scattering (SBS) suppressing optical phase/frequency modulation of each of the plurality of optical carriers, wherein the synchronization mechanism is a synchronization clock.

5. The apparatus of claim 4, further comprising, a tone generator coupled to each of the plurality of optical transmitters that is synchronized to the synchronization clock.

6. A hybrid fiber cable network, comprising the apparatus of claim 4.

7. An apparatus for transmitting RF signals over optical fiber, comprising:
means to generate two or more optical carriers, each at different optical wavelengths and;
means to modulate primarily the optical power of each optical carrier with a RF signal to be transmitted;
means to modulate primarily the optical phase/frequency of each optical carrier independently;
means for combining the modulated optical carriers for transmission over a single optical fiber and;
means to synchronize the modulation of the primarily optical phase/frequency modulation between all optical carriers so that the primarily optical phase/frequency modulation occurs substantially in unison at the output of the optical combiner and with substantially the same phase/frequency modulation amplitudes,
wherein the means to synchronize the optical phase/frequency modulation includes distributing a common clock to each signal generator used to drive each optical phase/frequency modulation mechanism associated with each optical carrier wherein each signal generator is synchronized to the common clock.

8. The apparatus of claim 7 wherein the means to synchronize the optical phase/frequency modulation includes a single signal generator whose signal is distributed to each optical phase/frequency modulation mechanism associated with each optical carrier and used to drive the primarily optical phase/frequency modulation mechanisms associated with each optical carrier.

9. The apparatus of claim 7 wherein the means to modulate primarily the optical phase/frequency of each carrier independently includes directly modulating the drive laser of an externally modulated laser transmitter.

10. The apparatus of claim 9, further comprising an optical modulator placed after the laser to reduce or eliminate the amplitude modulation component associated with directly modulating the drive laser.

11. The apparatus of claim 7 wherein the means to modulate the optical phase/frequency includes an optical phase modulator.

12. A method for transmitting RF signals over fiber optics comprising:
generating two or more optical carriers, each at a different wavelength;
modulating primarily the optical power of each optical carrier with a RF signal to be transmitted;
modulating primarily the optical phase/frequency of each optical carrier;
combining the modulated optical carriers for transmission over a single optical fiber; and
synchronizing the optical phase/frequency modulation of each optical carrier so that at the output of the optical combiner, the optical phase/frequency modulation of all carriers is substantially in unison and with substantially the same phase/frequency modulation amplitude wherein the method to synchronize the optical phase/frequency comprises:
distributing a common clock to each signal generator that drives the optical phase/frequency modulation mechanism associated with each optical carrier; and
using the common clock to synchronize the phase(s) and frequency or frequencies output by each signal generator in such a manner to achieve optical phase/frequency modulation of all optical carriers substantially in unison at the output of the optical combiner.

13. The method of claim 12 wherein the method to synchronize the optical phase/frequency modulation includes:
generating a frequency or frequencies with a common signal generator and distributing the signal to each optical phase/frequency modulation mechanism associated with each optical carrier and;
with appropriate signal delay or delay mechanisms achieve optical phase/frequency modulation of all carriers substantially in unison that at the output of the optical combiner.

14. The method of claim 12 wherein the method to modulate the optical phase/frequency of each carrier includes directly modulating the drive laser of an externally modulated laser transmitter.

15. The method of claim 14 wherein an optical modulator placed after the laser is used to substantially reduce or eliminate the optical amplitude modulation component associated with directly modulating the drive laser.

16. The method of claim 12 wherein the method to modulate the optical phase/frequency of each optical carrier is achieved using an optical phase modulator.

* * * * *